(12) United States Patent
Stolowitz (10) Patent No.: US 7,543,110 B2
(45) Date of Patent: *Jun. 2, 2009

(54) RAID CONTROLLER DISK WRITE MASK

(75) Inventor: Michael C. Stolowitz, Danville, CA (US)

(73) Assignee: NVIDIA Corporation, Santa Clara, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/060,884

(22) Filed: Feb. 17, 2005

(65) Prior Publication Data

US 2005/0149678 A1 Jul. 7, 2005

Related U.S. Application Data

(62) Division of application No. 10/267,928, filed on Oct. 8, 2002, now Pat. No. 6,904,498.

(51) Int. Cl.
*G06F 12/00* (2006.01)

(52) U.S. Cl. .......... 711/114; 711/112; 711/154

(58) Field of Classification Search .......... 711/112, 711/114, 154
See application file for complete search history.

(56) References Cited

U.S. PATENT DOCUMENTS

| | | | | |
|---|---|---|---|---|
| 5,315,602 | A | 5/1994 | Noya et al. | 371/40.4 |
| 5,333,305 | A | 7/1994 | Neufeld | 395/575 |
| 5,408,644 | A * | 4/1995 | Schneider et al. | 714/1 |
| 5,596,709 | A | 1/1997 | Bond et al. | 395/182.05 |
| 5,603,004 | A | 2/1997 | Kurpanek et al. | 395/445 |
| 5,805,788 | A | 9/1998 | Johnson | 395/182.04 |
| 5,862,313 | A | 1/1999 | Johnson et al. | 395/182.04 |
| 6,003,144 | A | 12/1999 | Olarig et al. | 714/42 |
| 6,018,778 | A | 1/2000 | Stolowitz | 710/61 |
| 6,151,641 | A | 11/2000 | Herbert | 710/22 |
| 6,233,648 | B1 | 5/2001 | Tomita | 711/4 |
| 6,237,052 | B1 | 5/2001 | Stolowitz | 710/61 |
| 6,269,427 | B1 | 7/2001 | Kuttanna et al. | 711/140 |
| 6,282,671 | B1 | 8/2001 | Islam et al. | 714/6 |

FOREIGN PATENT DOCUMENTS

| | | |
|---|---|---|
| WO | WO 97/07461 | 2/1997 |
| WO | WO 99/26150 | 5/1999 |
| WO | WO 00/52802 | 9/2000 |
| WO | WO 01/22221 A1 | 3/2001 |
| WO | WO 01/31453 A1 | 5/2001 |

* cited by examiner

*Primary Examiner*—Hetul Patel
(74) *Attorney, Agent, or Firm*—Zilka-Kotab, PC (57) ABSTRACT

A RAID disk array controller implements a write mask to support partial-stripe updates from a host system without expensive RAM to RAM copying and repeated disk accesses to assemble the updated stripe. New data from the host is transferred into a single buffer and a local processor tracks—by setting bits in the write mask—which segments of the target stripe are updated. The disk array is accessed to transfer the target stripe into the same buffer, but the buffer memory write enable is inhibited—responsive to the write mask—during transfer of the segments that were updated by the host. The complete, updated stripe is thus formed in a single buffer for parity calculations and write to the disk array.

22 Claims, 7 Drawing Sheets

RAID CONTROLLER DISK WRITE MASK

TECHNICAL FIELD

This application is a division of U.S. application Ser. No. 10/267,928, filed Oct. 8, 2002. This invention pertains to digital data storage and, more specifically, is directed to improved performance in RAID disk storage array systems.

BACKGROUND OF THE INVENTION

In a RAID disk storage array, data is written in "stripes" across the drives of the disk array so that subsequent accesses of the data will be able to take advantage of the combined transfer rate of the drives of the array for "large" accesses. Since the smallest addressable unit of storage for a disk drive typically is the sector, a stripe will consist of at least one sector per drive. For RAID-3 and RAID-5 configurations, a redundancy pattern is computed across the stripe and stored along with the data to enable error checking and correction, even in the event of a drive failure.

Figure 1A:
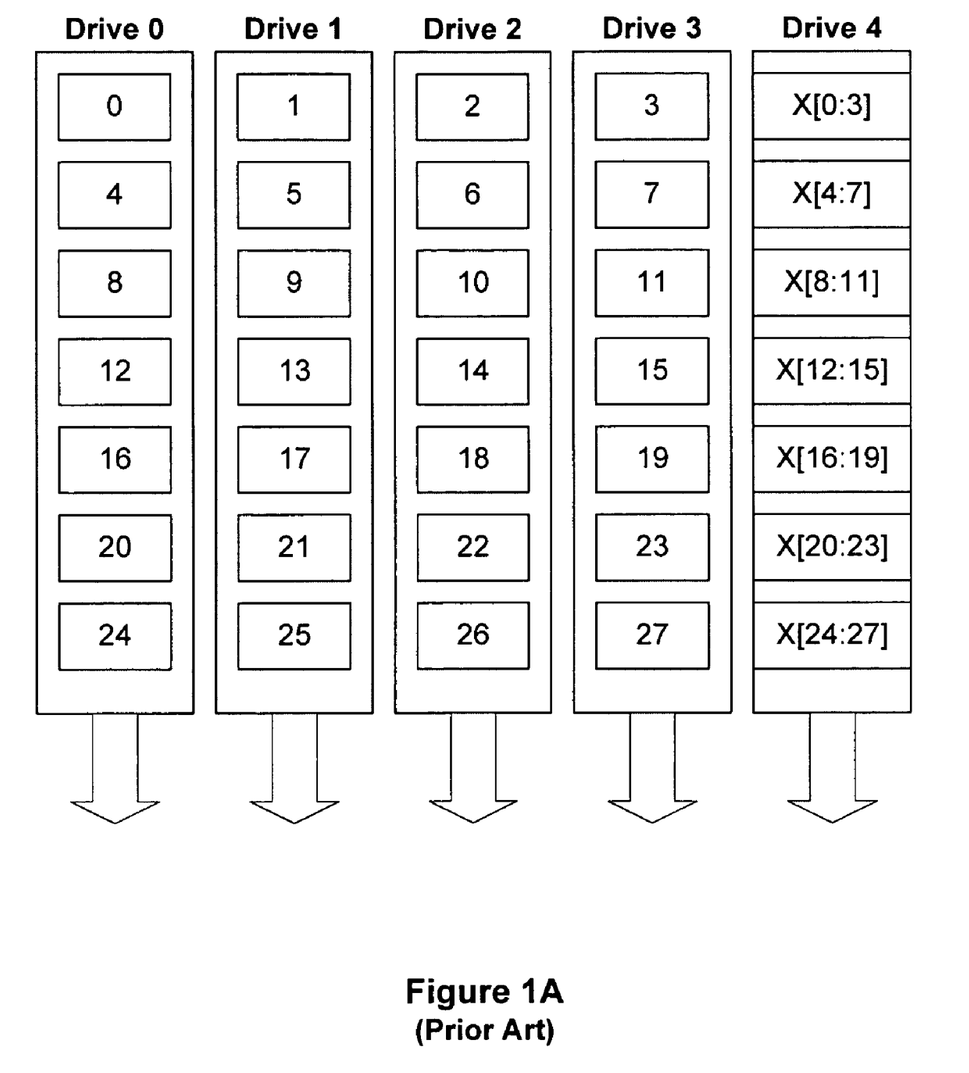
FIG. 1A is a conceptual illustration of a RAID-3 storage disk array.

To illustrate, FIG. 1A is a conceptual diagram of a disk storage array, in which five drives are shown (Drive 0-Drive 4), although the number of drives is not critical. Each individual square in the figure represents one block of data—in the generic sense of any predetermined unit of storage. The drives labeled 0-3 are data drives. Drive 4 is the parity or redundancy drive in this configuration, generally known as RAID-3. Data is "striped" over the data drives. This means that for any selected stripe width, consecutive data blocks of that size, for example one sector, are stored in sequence across consecutive data drives. This sequence is indicated by the arabic numbers in each storage block.

The bit-by-bit exclusive-OR function of the four data blocks (for example, 0-3) that make up each stripe is stored in the corresponding block of the parity drive. This exclusive-OR notation in FIG. 1 is "X[A:B]" indicating the exclusive-OR of the blocks of user data beginning with A and ending with B. Thus, for example, the XOR function for blocks 4-7 is shown in Drive 4 as "X[4:7]". Using this RAID-3 configuration, the contents of a block of data on any failed drive can be reconstructed by computing the exclusive-OR of the remaining blocks of its stripe including the parity block. "On the fly" reconstruction of data is taught in commonly-assigned U.S. Pat. No. 6,237,052 —hereby incorporated by reference. U.S. Pat. No. 6,237,052, however, does not address the problem of updates to data that affect less than one stripe.

Figure 1B:
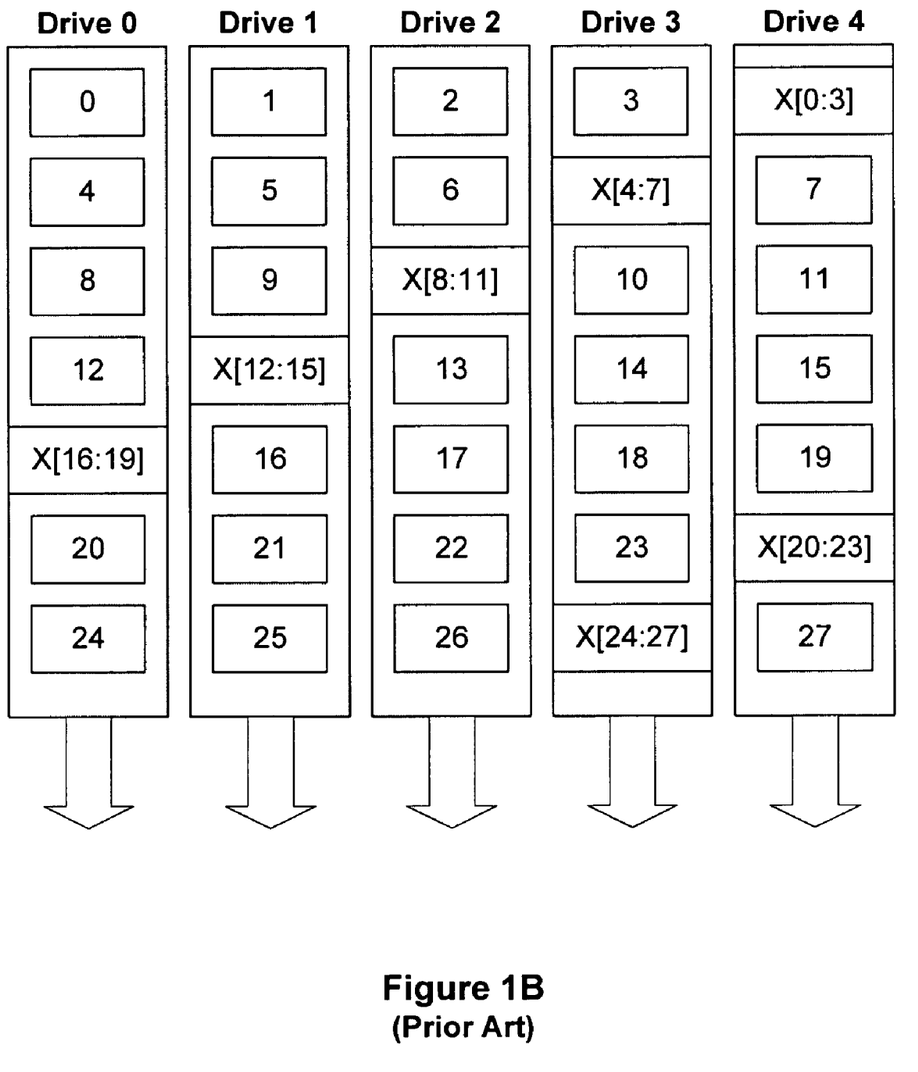
FIG. 1B is a conceptual illustration of a RAID-5 storage disk array.

FIG. 1B is similar to FIG. 1A except that the parity data is distributed over all of the drives of the array, thereby creating a RAID-5 configuration. The RAID-5 organization typically is used for systems in which the parity writes to a single drive would create a performance bottleneck. The RAID-5 configuration allows all of the drives of the array to participate concurrently in the parity write problem, thereby easing the bottleneck.

U.S. Pat. No. 5,805,788 describes RAID-5 parity generation and data reconstruction in greater detail. In particular, it discloses a "brute force" method comprising reading the data from a local buffer, computing the parity, and then writing the result back to the buffer. That methodology has limited application, however, because buffer bandwidth tends to be the bottleneck in systems that have a fast host bus and a large array of drives.

U.S. Pat. No. 6,233,648 is entitled "Disk Storage System And Data Update Method Used Therefor." This patent discloses a disk write method in which updates, which are not necessarily blocks of contiguous data, are accumulated until there is a convenient amount (e.g., a stripe), and then the accumulated data is written as a block to a new area on the array. While this technique makes writes very efficient, read operations require a special table to find the data.

In any disk storage array, when only a portion of a stripe of data is updated by the host system (a "partial-stripe update"), the balance of the stripe must be accessed from the drives (essentially a read operation), so that a new redundancy pattern can be correctly computed on the entire updated stripe. In prior art, a buffer is allocated (typically in RAM) in which to assemble the new stripe. Updated data is written from the host into the buffer. In the buffer, sectors corresponding to the data updated by the host are valid, while the contents of the remaining sectors of the stripe are temporarily undefined.

The disk array controller further allocates a second buffer (also typically in RAM), into which it reads the current contents of the entire stripe from the drives. The controller then copies all of the sectors which had not been updated by the host, from the second buffer (disk image stripe buffer) to the first buffer (the new stripe buffer), where they are merged with the updated data from the host to complete the updated stripe. At this point, the first stripe buffer will contain all valid data, with new sectors from the host and current (old) sectors from the drives. An updated redundancy can now be computed.

Ideally, a stripe buffer in the controller would be written once by the host and read once in order to write to the disk array. For the partial-stripe update scenario just described, however, in addition to the normal read and write of the buffer, an additional operation is required to access the current contents of the stripe, and additional reads and writes are required to copy those sectors which were not updated by the host, as described above. These problems increase the frequency of disk access and negatively impact disk array performance. What is needed is more efficient methods and apparatus for processing partial-stripe updates to data stored in a disk storage array such as a RAID system.

SUMMARY OF THE INVENTION

In view of the foregoing background, an object of the present invention is to reduce the processing overhead occasioned in a disk array controller by partial-stripe updates.

Another object is to reduce or eliminate the RAM to RAM buffer memory accesses necessary to assemble an updated stripe of data.

A further object of the invention is to manage a stripe data cache so as to reduce the frequency of disk accesses in general, and those necessitated by partial-stripe updates in particular.

In accordance with one aspect of the present invention, buffer to buffer (typically RAM to RAM) transfers can be eliminated as follows. A local processor keeps track of which of the sectors of a given stripe have been updated by the host system. One method for maintaining this information is to create a linear bit vector (or "write mask") with one bit representing each sector in the stripe. When a stripe buffer is allocated for a disk write operation, the bits of the vector are cleared. For each sector that is updated by the host, the corresponding bit of the vector is set. Once the host has completed its updates to the current stripe, 1's in the vector will indicate the updated sectors while 0's in the vector indicate locations of the stripe buffer that are currently undefined. The current contents of these undefined sectors must be read from the disk and placed into the buffer so that the updated stripe (and a redundancy computed on the entire stripe) can be written to the disk array.

Simply reading the current stripe from the disk array to the stripe buffer would "fill in" the undefined sectors, but would also overwrite the updated ones, destroying the host data. The present invention accomplishes the partial stripe update taking advantage of both the full stripe read and write optimizations, while eliminating the second buffer and any copying of data segments between buffers. When the host has finished updating selected data, the disk array stripe read hardware is configured to read the current state of the affected stripe into the same buffer.

In one embodiment, a segment counter is cleared and the write mask is enabled. As the segments of the stripe are transferred from the drive array to the buffer, they are counted by the segment counter. If the write mask bit selected by the state of the segment counter is set, the buffer memory is write inhibited. When the mask bit selected by the segment count is not set, the data from the drive array is written into the buffer. In this way, the complete, updated stripe is formed in a single buffer, with at most one disk read access.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 2:
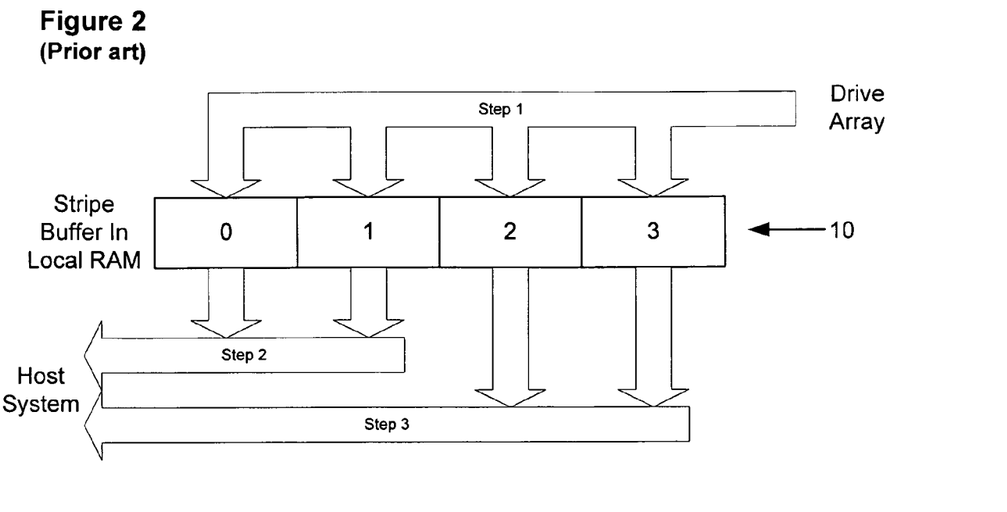
FIG. 2 is a simplified data flow diagram illustrating a known disk read operation.

A conventional RAID system implementing striping and parity will usually buffer data transfers between the drive array and the host system that it supports. Increasing this local memory allows the RAID system to cache blocks of data thereby enhancing performance. For the read direction, the RAID system may read an entire stripe into the buffer even though the host system requested only a portion of the blocks within that stripe. This is illustrated in FIG. 2: The host system (not shown) makes a read request. In response, the controller reads a whole stripe of data from the disk array, see "step 1," into the stripe buffer 10 implemented in local RAM. The data stripe in this illustration consists of a series of four blocks, 0-3, which may be disk sectors. In "step 2" the requested data, namely sectors 0 and 1, is transferred to the host system (generally via a host interface). In the event that the host later "reads" data corresponding to sectors 2 and/or 3 of the same stripe, it can be delivered immediately from the buffer 10 without another disk access. To the extent that disk accesses are frequently sequential, there is a high probability that the host will request blocks of data close to the ones previously accessed.

Figure 3:
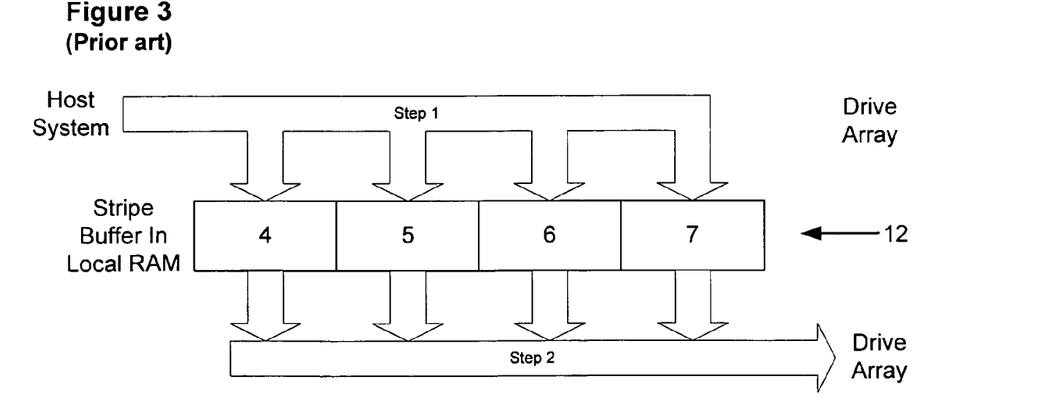
FIG. 3 is a simplified data flow diagram illustrating a known disk write operation.

FIG. 3 illustrates a disk write operation. Here, the host system passes data to the RAID system for storage on the drive array. In this simplified illustration, referring to "step 1," a sequence of four blocks of data (4-7) are transferred into the buffer 12 from the host, which happens to correspond to a complete stripe. In this case, the RAID system has all of the data needed to compute the data block for the parity drive. The parity block is computed (not shown) and the entire stripe is written to the drive array—"step 2."

Figure 4:
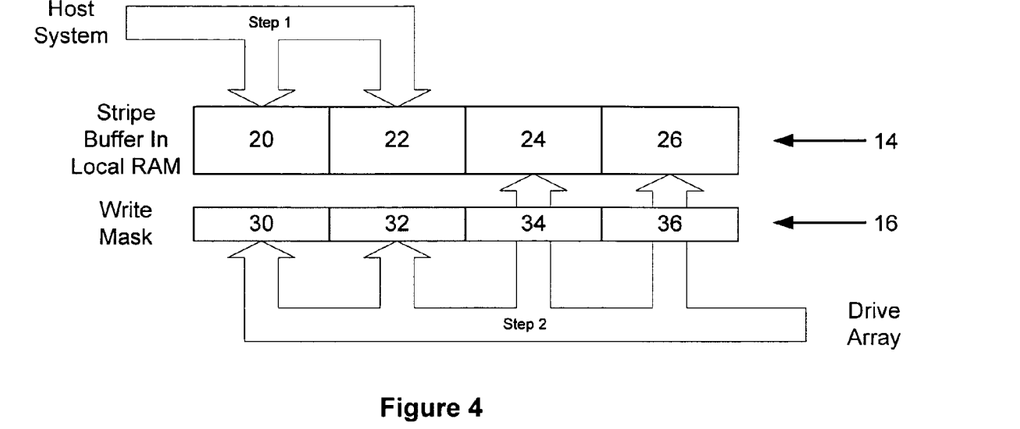
FIG. 4 is a simplified data flow diagram illustrating operation of a single stripe buffer and a write mask in accordance with the present invention for updating a partial stripe of stored data.

FIG. 4 illustrates conceptually one aspect of the present invention in which filling a stripe buffer 14 is managed in response to the content of a write mask 16. As before, the stripe buffer preferably is implemented in RAM local to the disk controller. The stripe buffer 14 in this case is allocated four memory segments or blocks, reference numbers 20, 22, 24, 26. In "step 1," a sequence of two blocks of updated data from the host (that happen to correspond to the first half of a stripe) are transferred into buffer memory blocks 20,22. These two blocks will eventually be stored on drives 0 and 1 while the data stored on drives 2 and 3 for the same stripe will remain unchanged. The complication for any partial stripe write is that the parity drive must end up with the exclusive-OR function of all of the blocks in the stripe, i.e., all of the new (updated) blocks and all of the blocks that are not currently being changed. For the RAID system to compute this information, it must first access the array to obtain the blocks that are not being changed. Thus, the current write operation (from the host perspective) requires a disk read access along the way. Later we discuss how to minimize the frequency of disk read accesses resulting from partial stripe updates. Presently, we explain how to assemble the newly updated, complete stripe in a single buffer.

This update can be accomplished in a variety of ways. The RAID controller might first compute the exclusive-OR of the new blocks and store the new blocks on the appropriate drives of the array (drive 0 and drive 1 in this case). It could then read the unchanged blocks, and compute the exclusive-OR of the data from these blocks with the previous result from the new blocks. The result of this computation would then be stored on the parity drive.

Assuming that the RAID controller has highly optimized hardware for reading and writing full stripes, however, other approaches are more attractive. One approach would be to simply fill in the undefined blocks of the buffer (24,26) by reading just the unchanged blocks of the stripe from the drive array and storing them in the appropriate positions of the buffer. This would allow the RAID system to take advantage of the hardware used to write full stripes, but would require several array accesses to read individual blocks.

An alternative approach, as mentioned in the background section above, is to use the full stripe read capability to read the entire stripe from the array into a second buffer. The RAID system could then complete an image of the new stripe by one of two methods. It could either copy the new segments from their buffer, replacing the appropriate segments of the stripe read from the array with updated data, or it could copy only those segments of the stripe read from the drive array that are not being replaced with updated data to the undefined segments of the stripe buffer concatenated with the new segment data. In either case, the image of the new stripe has been created and can then be written to the array using the full stripe write hardware. These techniques require a second buffer and additional copying steps, however, that degrade the storage system performance.

The present invention accomplishes the partial stripe update while taking advantage of both the full stripe read and write optimizations, while eliminating the second buffer and any copying of data segments between buffers. An important aspect of the invention is a write protection mask, or simply "write mask" preferably implemented in the buffer hardware and/or software.

In the course of collecting the write data from the host in a buffer, the RAID system hardware or firmware keeps track which segments of the stripe have valid data from the host and which are undefined. The simplest way to record this data is to maintain a "bit map" of the stripe in which consecutive bits are used to indicate that the corresponding segment of the stripe has been updated. When the write data buffer is allocated, the write mask for the buffer is initially cleared. As each segment is received, the bit corresponding to that segment is set. In this application, we use "segment" broadly—it could be any chunk of data from an entire disk sector down to a byte.

When the host has finished updating segments, the disk array stripe read hardware is configured to read the current state of that stripe into the same buffer as follows. A segment counter is cleared and the write mask 16 is enabled. As the segments of the stripe are transferred from the drive array to the buffer, they are counted by the segment counter. If the write mask bit selected by the state of the segment counter is set, the buffer memory is write inhibited. Consequently, the corresponding segment is not stored in the buffer. When the mask bit selected by the segment counter is not set, the data from the drive array is written into the buffer. In the example of FIG. 4, the writing of segments 20 and 22 from the drive array will be masked, protecting the new segments from the host. The writing of segments 24 and 26 will not be masked, allowing this data to fill in the undefined segments of the buffer 14. At the completion of the full stripe read with masked buffer write operations, the buffer 14 will be holding the completed image of the new stripe which may be written back to the drive array using the full stripe write capability as shown in FIG. 5 ("Step 1").

Referring again to FIG. 4, the write mask 16 is shown having four bit positions, labeled for reference 30,32,34 and 36. Each bit position corresponds to one segment or block of the stripe buffer—20,22,24 and 26 respectively. Various implementations and stripe sizes are described later. FIG. 4 is merely intended to illustrate the write mask concept. In "step 1," host data is transferred into data blocks 20,22 of the stripe buffer 14. As each block of data is transferred, the corresponding bit position of the write mask 16 is set—in this case bits 30,32. In "step 2," the drive array is accessed to read the entire stripe of interest, but only data blocks 24,26 are actually stored into the buffer 14. During the transfer, write mask bits 30,32 are used to inhibit the buffer memory write enable as the corresponding data blocks are coming from the drive array interface. A presently preferred embodiment of this feature is described below with reference to FIG. 6.

Figure 5:
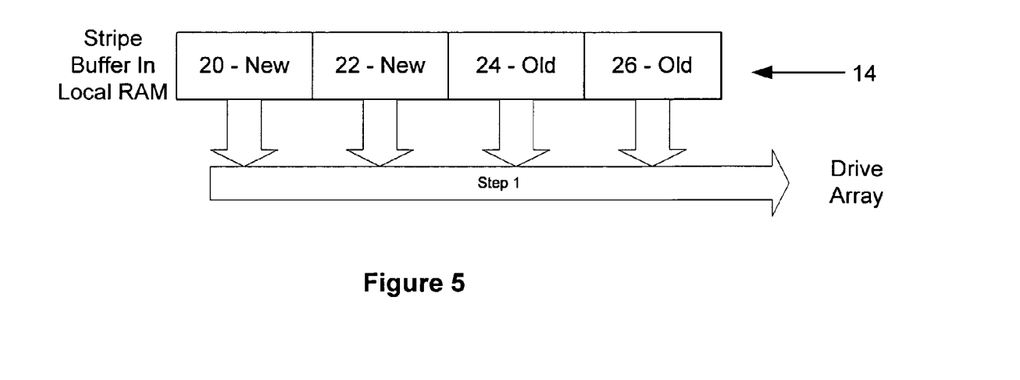
FIG. 5 is a simplified data flow diagram illustrating writing the updated stripe buffer contents of FIG. 4 to a disk drive array.

To complete the partial stripe update, referring now to FIG. 5, the entire stripe is transferred from the buffer 14 to the drive array. As indicated in the drawing, blocks 20,22 have "new" data (from the host) while blocks 24,26 have "old" data from the disk image before the update. This was accomplished with a single buffer.

Figure 6:
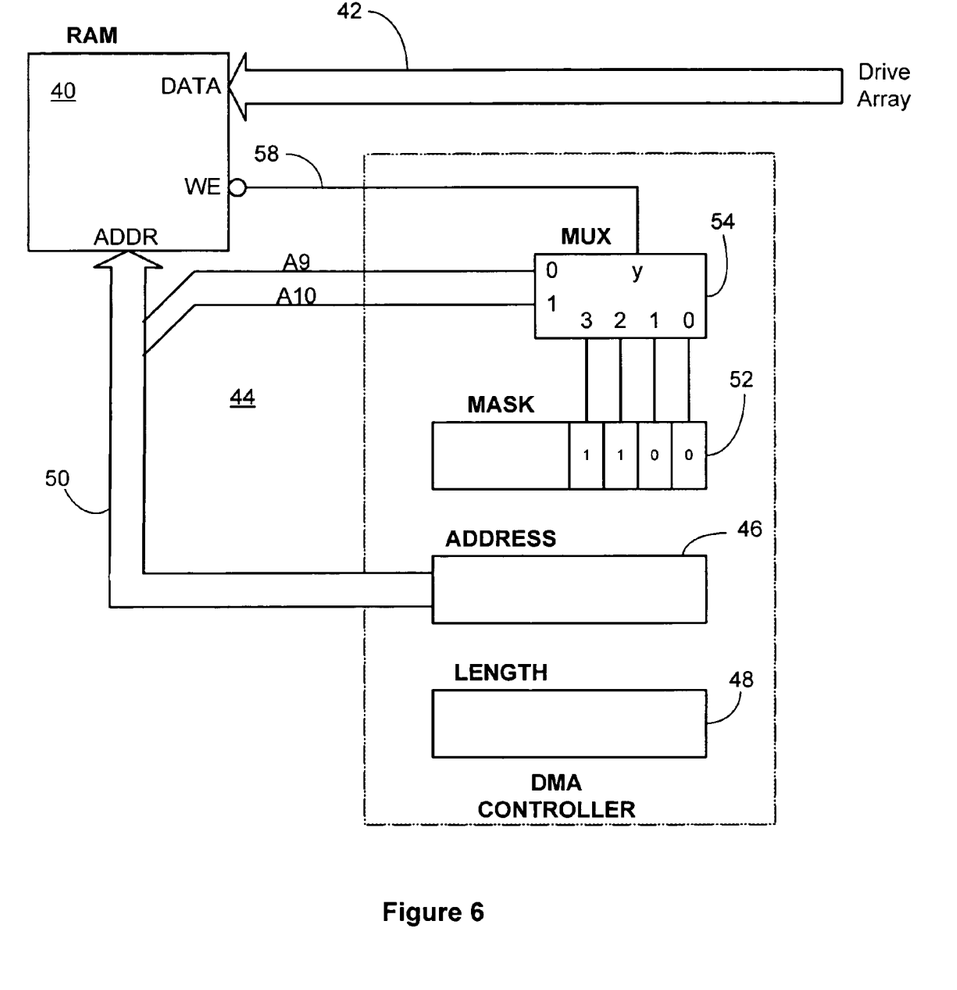
FIG. 6 is a simplified schematic diagram of a buffer memory and associated write logic circuitry.

FIG. 6 is a simplified schematic diagram of a buffer memory and associated write logic circuitry in accordance with one embodiment of the invention. Here, a RAM memory 40 is used to realize one or more stripe buffers, allocated by a local processor (not shown). The RAM 40 may have multiple ports, and includes a data port coupled to a drive array data bus 42. The RAM control logic 44 includes a Direct Memory Access (DMA) controller, comprising a DMA address counter 46 and length counter 48. The address counter 46 provides addresses to the RAM 40 via address bus 50 for DMA operations. In a presently preferred embodiment, the write mask logic is implemented within the RAM control logic. The write mask logic includes the write mask register 52 and a multiplexer 54; in this illustration a 4-to-1 multiplexer.

In operation, the local processor would initialize the DMA channel for a data transfer by loading a starting byte address into the address counter 46, the byte length of the buffer in the length counter 48, and a four-bit value (in this illustration) into the mask register 52. Following the transfer of each 64-bit word from the drive array via bus 42 into RAM 40 at the address pointed to by the address counter, the address counter is incremented by eight bytes so that it points to the starting address of the next word in the buffer. The Length counter is decremented by eight bytes. When the Length counter reaches zero, the process is halted. The particular word sizes, bus size, mask register size, etc. may vary for different applications and drive interfaces without departing from the scope of the present invention.

The illustrative implementation shown in FIG. 6 assumes that all of the data buffers in the RAM are 2K bytes long and are aligned on modulo 2K address boundaries. To use the write mask logic for the transfer shown in FIG. 4, the mask register 52 is loaded with the binary value 1100$b$ indicating that sectors 0 and 1 (20,22 in FIG. 4) are to be written while sectors 2 and 3 (labeled 24,26) are to be masked. At the start of the transfer, bits 9 and 10 of the address counter 46 are zero because the counter has been loaded with an address that is a 2K boundary. These signals are labeled A9, A10 in FIG. 6 (a subset of address bus 50). These signals A9, A10 are input to the address inputs of the multiplexer 54 as shown. The multiplexer 54 will select bit 0 of the mask register 52 which is zero, and assert this value at the active-low write enable ("WE") input 58 of the RAM 40. Throughout the transfer of the first sector, the RAM will be write enabled. At the end of the first sector, the address counter will count to a value in which address bit A9 is asserted. This will cause the multiplexer to select bit 1 from the write mask (also value 0) and assert this value at the write enable input 58 of the RAM, enabling writes for the duration of the second sector.

At the end of the second sector, the address counter counts to a value in which bits A10 and A9 are 1 and 0, respectively, thereby selecting the third bit of the mask register which is a one. Asserting this value at the active-low WE input of the RAM 40 will inhibit writes during the transfer of the third sector. Note that the address counter and length counter continue to count, but the data from the drive array will be ignored, thereby protecting the current contents of the buffer for that sector, namely the updated data transferred from the host system (through another RAM port not shown). At the end of the third sector, the address counter counts to a value in which bits A10 and A9 are both one. This causes the multiplexer to select the fourth bit of the mask register which is also a one. Asserting this value at the write enable of the RAM will inhibit writes during the transfer of the fourth sector. At the end of the fourth sector, the length counter will count to zero ending the transfer.

The foregoing descriptions of the invention so far have referred to the striping of blocks or segments without reference to a particular size. In practice, possible block lengths range from a single bit to several sectors. For RAID systems built from standard SCSI controller chips that are not capable of addressing less than a single sector, a stripe of one or more sectors wide is used. The write mask described above may be used, but higher performance might be achieved with selective reads (less than a whole stripe). In the context of a synchronous redundant data transfer technology, such as described in U.S. Pat. No. 6,237,052 B1, where the stripe may be only sixteen bits or one word in width, partial stripe updates affect every drive. With the synchronous access of multiple drives, the write mask is a most attractive approach.

Figure 7:
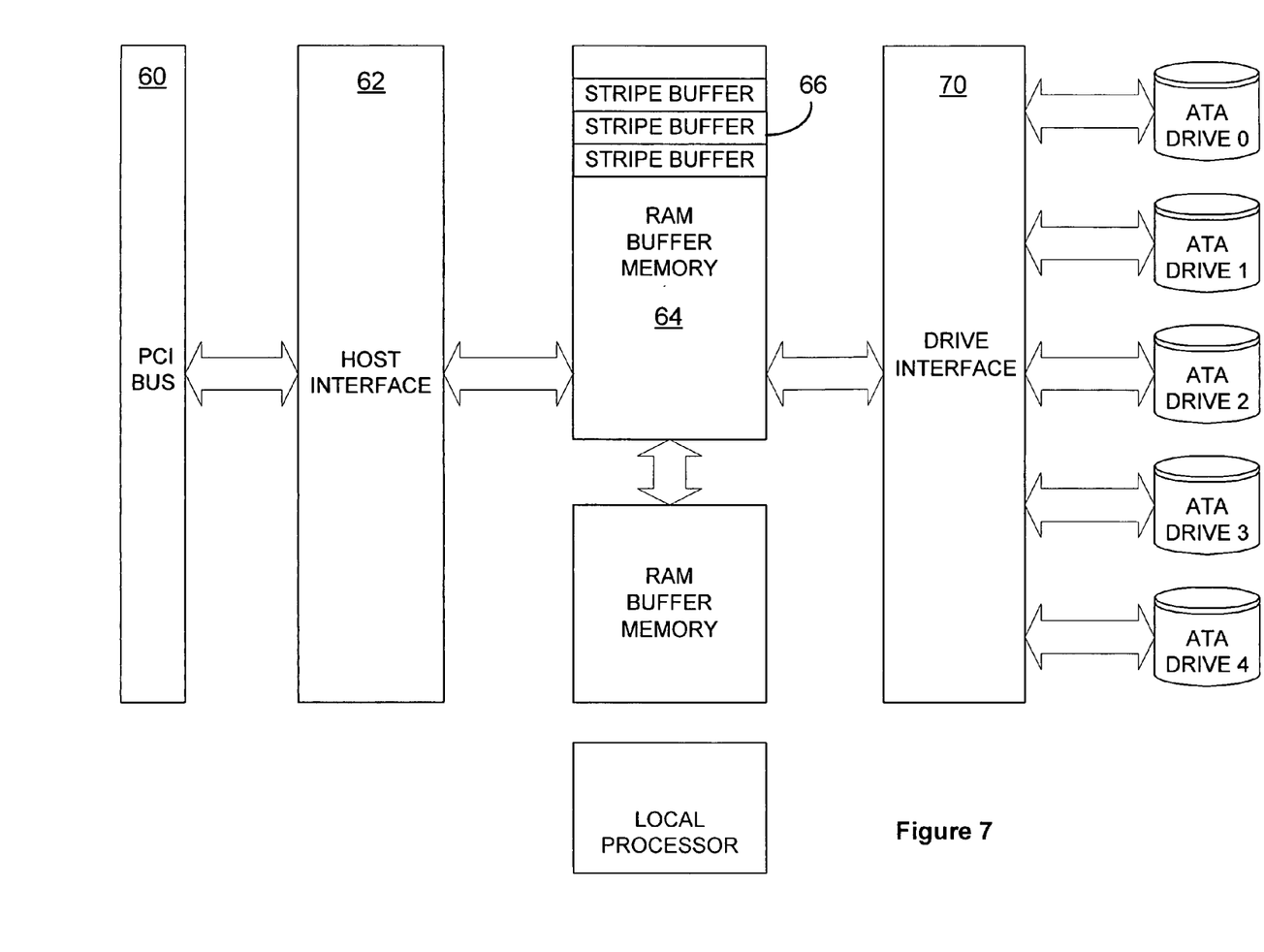
FIG. 7 is a simplified block diagram of a RAID system that incorporates aspects of the present invention.

FIG. 7 is a simplified hardware block diagram of a RAID controller and attached ATA drives in accordance with one application of the present invention. In this arrangement, a PCI bus 60 may be part of a host system. A host interface 62 provides an interface for data transfer between the PCI bus 60 and a RAM buffer memory 64. At the right side of the figure, a series of five ATA disk drives—Drive 0 to Drive 4—are attached to a drive interface 70. In a presently preferred embodiment, the RAM buffer memory 64 is multi-ported, and both the host interface 62 and the drive interface 70 implement DMA engines. The drive interface 70 would include the DMA and write mask logic described above with reference to FIG. 6. In a current commercial embodiment of the invention, a disk array controller as generally illustrated in FIG. 7, including the host interface, drive interface, local processor, and firmware are implemented on monolithic semiconductor integrated circuit.

In general, a RAID disk array controller system according to the present invention comprises a host interface for transferring data to and from a host bus and a drive interface for transferring data to and from an array of disk drives. Data is stored in the array as a series of data segments defining a stripe. The system further includes a random access buffer memory having at least a first port coupled to the host interface and a second port coupled to the drive interface. The drive interface includes buffer memory write logic that implements DMA for writing data from the disk array to the buffer memory; and the write logic implements a write mask that inhibits writing into the buffer memory for zero or more selected segments of the data moving from the drive array into the buffer memory during a DMA write operation.

Caching

The local processor running on the controller can be programmed, preferably using firmware, to cache stripes of data in a RAM buffer memory. FIG. 7, for example, illustrates a RAM buffer memory 64 that can realize a caching strategy allocating a plurality of individual stripe buffers, e.g., stripe buffer 66. A portion of the RAM holds tables used to maintain the cache, called a cache control table (not shown). Each entry in the cache control table includes the target address of the stripe on the disk array, the location of the stripe in the RAM, and a write mask.

Figure 8A:
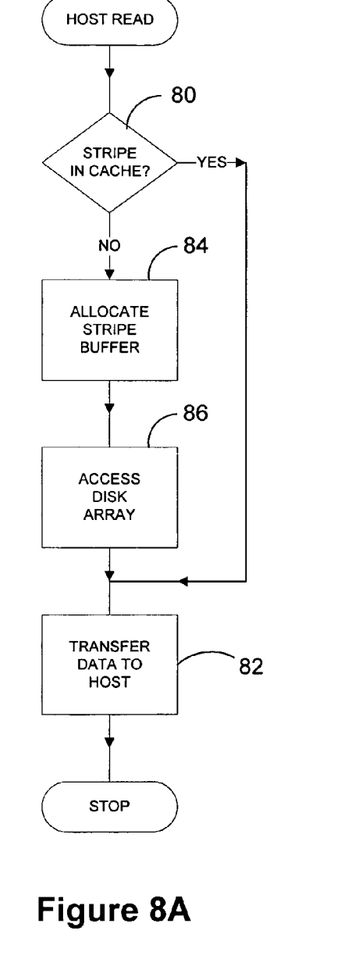
FIGS. 8A-8C are flow diagrams illustrating various operations in accordance with one embodiment of the present invention.

FIG. 8A is a flow-chart of a host read operation where a stripe cache strategy is implemented. When the host system requests data from the disk array, the local processor first checks the cache control table for the target stripe 80. If it is found, transferring data directly from the cache 82 without having to access the disk array satisfies the host request. If not, an available stripe buffer and table entry are allocated 84 to the requested stripe, the disk array is accessed 86 storing the data (full stripe) in the assigned stripe buffer, and the then the stripe or portions thereof requested by the host are transferred.

Figure 8B:
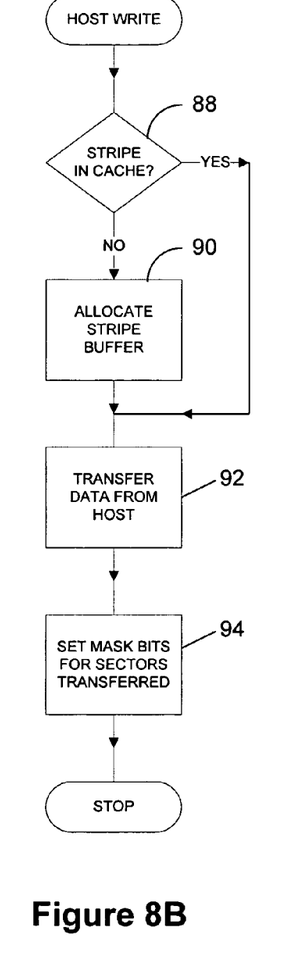

FIG. 8B is a flow-chart of a host write operation where a stripe cache strategy is implemented. When the host writes data to the disk array, the cache control table is again searched for the target stripe 88. If the stripe is not already in the cache, an available stripe buffer and table entry are allocated 90 for the stripe and data is accepted from the host 92 and transferred into the allocated buffer. For each sector of the stripe received from the host, the corresponding bit of the update mask in the stripe's cache control table entry is set 94. The update mask was cleared when the buffer was allocated, so the update mask will maintain a record of sectors within the stripe that must eventually be written to the disk array. Unless the entire stripe has been updated, the disk write may be postponed allowing the host ample opportunity to write additional sectors of the buffer and possibly avoiding the disk read required by a partial stripe write. If the host has written the entire stripe, i.e., all of the update bits have been set, this stripe may be written to disk array.

Figure 8C:
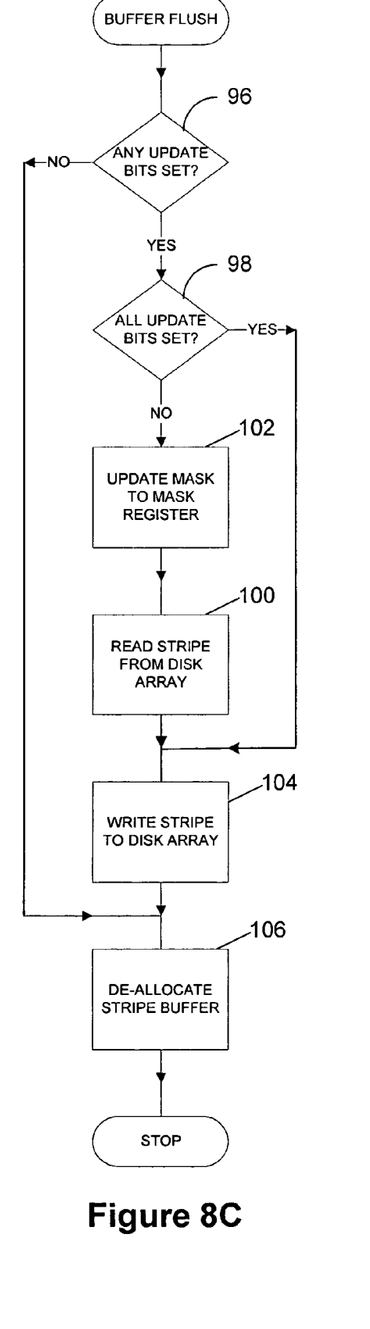

Referring now to FIG. 8C, a buffer flush procedure is illustrated. In a presently preferred embodiment, the cache control table is a doubly linked and multiply threaded list. Each time it is searched, the list is re-linked to bring the most recently used entry to the front. If the end of the list is encountered, and the target stripe is not found, then the last entry points to the least recently used buffer. That is the buffer of interest. If it has not been updated, query 96, the corresponding stripe buffer can be de-allocated, step 106.

If some but not all of the update bits have been set, test 98, the corresponding stripe of data is read 100 from the disk array into the stripe buffer, but first, the update mask is loaded 102 into the mask register, thereby protecting the sectors written by the host and only allowing the balance of the stripe to be filled in from the disk array. Following this masked read, the entire (updated) stripe is in the buffer and can be written 104 to the disk array as described above. The stripe buffer and its table entry may either be de-allocated 106 or the update bits may simply be cleared leaving the stripe in the cache.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method for effecting a partial-stripe update in a RAID system using only a single stripe buffer where the disk storage array is coupled to a host bus via a disk array controller, the method comprising the steps of:

writing at least one segment of updated data from the host bus into the stripe buffer;

determining which segments of the stripe buffer contain updated data from the host bus;

reading from the disk storage array a full stripe of stored data associated with the updated data;

overwriting the stripe buffer with the stored data read from the disk storage array but only in the segments of the stripe buffer that do not contain updated data from the host bus; and writing the stripe buffer contents to the disk storage array, thereby obviating the need for additional read and write operations to store the updated data into the disk storage array;

wherein the writing the stripe buffer contents to the disk storage array is postponed for allowing additional updated data to be written to additional segments of the stripe buffer from the host bus.

2. A method according to claim 1 wherein the step of determining which segments of the stripe buffer contain updated data comprises:

initializing a linear bit vector comprising a series of bits, each bit corresponding to a segment of the stripe buffer, and all of said bits being initialized to a first state; and responsive to said writing at least one segment of updated data from the host bus into the stripe buffer, changing the state of the corresponding bits in the linear bit vector.

3. A method according to claim 1 and further comprising calculating redundant data based on the contents of the stripe buffer; and wherein the redundant data is calculated on-the-fly during transfer of data from the stripe buffer to the disk storage array.

4. A method according to claim 1 wherein the stripe buffer is realized in a cache memory.

5. A method according to claim 1 wherein the stripe buffer is realized in RAM.

6. A method according to claim 5 wherein the stripe buffer is realized in SDRAM.

7. A method according to claim 1 wherein the recited method is managed by a local processor coupled to the host bus, to the stripe buffer and to the drives in the disk storage array.

8. A method according to claim 7 wherein the local processor is coupled to the host bus via a host interface circuit.

9. A method according to claim 7 wherein the local processor is coupled to the drives via a drive interface circuit.

10. A method according to claim 9 wherein drive interface circuit comprises a plurality of ATA drive interfaces.

11. A method according to claim 1 wherein the stripe buffer is allocated a size equal to the size of a stripe of data as stored in the disk storage array.

12. A method according to claim 1 wherein the stripe buffer is allocated a size equal to an integer number of sectors, where the sector size is that of the disk drives in the disk storage array.

13. A method according to claim 1 wherein the stripe buffer is allocated a width equal to one or more data words.

14. A method according to claim 1 wherein the stripe buffer is allocated a width equal to one or more data words and a length equal to the data port size of each of the drives multiplied by the number of disk drives in the disk storage array.

15. A method according to claim 1 wherein for each of the segments of the stripe buffer written with the updated data, a bit of an update mask is set.

16. A method according to claim 15 wherein the writing the stripe buffer contents to the disk storage array is performed in response to a determination that bits of the update mask associated with the entire stripe buffer have been set.

17. A method according to claim 1 wherein the writing the stripe buffer contents to the disk storage array is postponed if at least one of the segments of the stripe buffer does not contain updated data from the host bus, and the writing the stripe buffer contents to the disk storage array is not postponed if all segments of the stripe buffer contain updated data from the host bus.

18. A method of updating data stored in a disk storage array coupled to a host bus using only a single buffer, the method comprising the steps of:

initializing a buffer memory for temporary data storage;

initializing a write mask for storing indicia of updated blocks of a current stripe of data;

writing a block of updated data from a host bus into the buffer memory;

storing in the write mask an indication of which block of updated data was written from the host bus into the buffer memory;

repeating said writing and storing steps at least zero times;

reading the current stripe of data from a disk storage array;

writing to the buffer memory only such blocks of the current stripe that are not indicated in the buffer memory, thereby forming a complete, updated stripe of data in the buffer memory; and then writing the complete, updated stripe of data of the buffer memory into the disk storage array;

wherein the writing the updated stripe of data of the buffer memory into the disk storage array is postponed for allowing additional updated data to be written into the buffer memory from the host bus.

19. A system for effecting a partial-stripe update in a RAID system using only a single stripe buffer where the disk storage array is coupled to a host bus via a disk array controller, the system comprising:

a host interface for writing at least one segment of updated data from a host bus into a stripe buffer;

a disk array stripe read hardware for determining which segments of the stripe buffer contain updated data from the host bus, reading from a disk storage array a full stripe of stored data associated with the updated data, and overwriting the stripe buffer with the stored data read from the disk storage array but only in the segments of the stripe buffer that do not contain updated data from the host bus; and a drive interface for writing the stripe buffer contents to the disk storage array, thereby obviating the need for additional read and write operations to store the updated data into the disk storage array;

wherein storing the stripe buffer contents in the disk storage array is postponed for allowing additional updated data to be written to additional segments of the stripe buffer from the host bus.

20. A system for updating data stored in a disk storage array coupled to a host bus using only a single buffer, the system comprising:

an initialized buffer memory for temporary data storage;

an initialized write mask for storing indicia of updated blocks of a current stripe of data;

a host interface for writing a block of updated data from a host bus into the buffer memory;

a write mask for storing an indication of which block of updated data was written from the host bus into the buffer memory;

a disk array stripe read hardware for reading the current stripe of data from a disk storage array, and writing to the buffer memory only such blocks of the current stripe that are not indicated in the write mask as having been updated by the writing updated data from the host bus to the buffer memory, thereby forming a complete, updated stripe of data in the buffer memory; and a drive interface for writing the complete, updated stripe of data of the buffer memory into the disk storage array;

wherein storing the updated stripe of data of the buffer memory in the disk storage array is postponed for allowing additional updated data to be written into the buffer memory from the host bus.

21. A system for effecting a partial-stripe update in a RAID system using only a single stripe buffer where the disk storage array is coupled to a host bus via a disk array controller, the system comprising:

logic for writing at least one segment of updated data from a host bus into a stripe buffer;

logic for determining which segments of the stripe buffer contain updated data from the host bus;

logic for reading from a disk storage array a full stripe of stored data associated with the updated data;

logic for overwriting the stripe buffer with the stored data read from the disk storage array but only in the segments of the stripe buffer that do not contain updated data from the host bus; and logic for writing the stripe buffer contents to the disk storage array, thereby obviating the need for additional read and write operations to store the updated data into the disk storage array;

wherein storing the stripe buffer contents in the disk storage array is postponed for allowing additional updated data to be written to additional segments of the stripe buffer from the host bus.

22. A system for updating data stored in a disk storage array coupled to a host bus using only a single buffer, the system comprising:

an initialized buffer memory for temporary data storage;

an initialized write mask for storing indicia of updated blocks of a current stripe of data;

logic for writing a block of updated data from a host bus into the buffer memory;

a write mask for storing an indication of which block of updated data was written from the host bus into the buffer memory;

logic for reading the current stripe of data from a disk storage array, logic for writing to the buffer memory only such blocks of the current stripe that are not indicated in the write mask as having been updated by the writing updated data from the host bus to the buffer memory, thereby forming a complete, updated stripe of data in the buffer memory; and logic for writing the complete, updated stripe of data of the buffer memory into the disk storage array;

wherein storing the updated stripe of data of the buffer memory in the disk storage array is postponed for allowing additional updated data to be written into the buffer memory from the host bus.

* * * * *

UNITED STATES PATENT AND TRADEMARK OFFICE
CERTIFICATE OF CORRECTION

| | | |
|---|---|---|
| PATENT NO. | : 7,543,110 B2 | Page 1 of 1 |
| APPLICATION NO. | : 11/060884 | |
| DATED | : June 2, 2009 | |
| INVENTOR(S) | : Stolowitz | |

It is certified that error appears in the above-identified patent and that said Letters Patent is hereby corrected as shown below:

In the claims:
Col. 9, line 20, please replace "to the drives" with -- to drives --;
Col. 9, line 26, please replace "wherein drive" with -- wherein the drive --;
Col. 9, line 33, please replace "of the disk" with -- of disk --;
Col. 9, line 39, please replace "each of the drives" with -- each drive in the disk storage array --;
Col. 9, line 40, please replace "the number of disk drives" with -- a number of the drives --;
Col. 10, line 2, please replace "the buffer" with -- the write mask as having been updated by the writing updated data from the host bus to the buffer --.

Signed and Sealed this
Fourteenth Day of June, 2011

David J. Kappos
*Director of the United States Patent and Trademark Office*